(12) United States Patent
Mitsubori et al.

(10) Patent No.: US 9,027,430 B2
(45) Date of Patent: May 12, 2015

(54) SHIFT DRUM STRUCTURE FOR DRUM-TYPE TRANSMISSION

(71) Applicant: Honda Motor Co., Ltd, Tokyo (JP)

(72) Inventors: Toshimasa Mitsubori, Wako (JP); Seiji Hamaoka, Wako (JP); Hiromi Sumi, Wako (JP); Kazuhiro Norita, Wako (JP); Yasushi Fujimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/036,913

(22) Filed: Sep. 25, 2013

(65) Prior Publication Data

US 2014/0083228 A1    Mar. 27, 2014

(30) Foreign Application Priority Data

Sep. 27, 2012  (JP) ................. 2012-215029

(51) Int. Cl.
  *F16H 63/20*  (2006.01)
  *F16H 61/26*  (2006.01)
  *F16H 63/18*  (2006.01)

(52) U.S. Cl.
  CPC ........... *F16H 61/26* (2013.01); *Y10T 74/20177* (2015.01); *F16H 63/18* (2013.01)

(58) Field of Classification Search
  CPC .................. F16H 57/02; F16H 57/027; F16H 2057/02043; F16H 63/20; F16H 63/30; F16H 63/32; F16H 59/10; F16H 59/042; B60K 20/02; B60K 20/04; B60K 20/06; B60K 17/344
  USPC ............... 74/473.37, 473.36, 473.31, 473.24, 74/473.3, 606 R
  See application file for complete search history.

(56) References Cited

U.S. PATENT DOCUMENTS

| | | | | |
|---|---|---|---|---|
| 4,529,080 | A * | 7/1985 | Dolan .................. | 192/109 A |
| 5,996,436 | A * | 12/1999 | Dreier et al. ............. | 74/473.21 |
| 6,997,073 | B2 * | 2/2006 | Hattori et al. ............. | 74/329 |
| 7,441,477 | B2 * | 10/2008 | Ho ........................ | 74/473.37 |
| 7,878,085 | B2 * | 2/2011 | Keyaki et al. ............. | 74/337.5 |
| 8,037,779 | B2 * | 10/2011 | Shiozaki et al. .......... | 74/473.36 |
| 8,091,447 | B2 * | 1/2012 | Garabello et al. ........ | 74/473.36 |
| 8,307,730 | B2 * | 11/2012 | Koyama et al. ........... | 74/335 |
| 8,696,513 | B2 * | 4/2014 | Brinn ..................... | 475/286 |
| 8,776,631 | B2 * | 7/2014 | Hada et al. ............... | 74/473.37 |

FOREIGN PATENT DOCUMENTS

JP    2515989 B2    7/1996

* cited by examiner

*Primary Examiner* — Ha D Ho
*Assistant Examiner* — Jude Agendia
(74) *Attorney, Agent, or Firm* — Westerman, Hattori, Daniels & Adrian, LLP

(57) ABSTRACT

A shift drum structure for a drum-type transmission in which a shift fork moving on a shift fork shaft in an axial direction while guided by a guide groove in response to a turn of a shift drum, changes speeds by sliding a shifter member on a transmission driving shaft pivotally supporting a transmission gear, the shift drum. The shift drum includes a cylindrical drum main body and drum spindles projecting outward from drum end walls on the respective two sides of the drum main body, and the guide groove formed in an outer peripheral surface of the drum main body in a circumferential direction, wherein in the shift drum, a work groove is formed in the outer peripheral surface of the drum main body from one end surface to an opposite end surface of the drum main body, or to the guide groove near the opposite end surface.

8 Claims, 12 Drawing Sheets

SHIFT DRUM STRUCTURE FOR DRUM-TYPE TRANSMISSION

CROSS-REFERENCE TO RELATED APPLICATION

This application claims foreign priority to Japanese Patent Application No. 2012-215029, filed Sep. 27, 2012, the entire contents of which are incorporated herein by reference.

BACKGROUND OF THE INVENTION

The present invention relates to a drum-type transmission configured to change shift steps by: causing the turn of a shift drum to move a shift fork in its axial direction while the shift fork is guided by a guide groove formed in the outer peripheral surface of a drum main body in the circumferential direction; and thereby moving a shifter member.

In this drum-type transmission, a shift drum is installed near a shift fork shaft configured to pivotally support shift forks in a way that the shift forks are movable in the axial direction, with the axial directions of the shift drum and the shift fork shaft oriented in parallel to each other, and with projecting engagement pin portions of the shift forks put in engagement with guide grooves which are formed in the outer peripheral surface of a drum main body in the circumferential direction (see Japanese Patent No. 2515989, for example).

According to Japanese Patent No. 2515989, two shift forks are pivotally supported by the shift fork shaft in a way that the shift forks are slidable in the axial direction and biased by a spring one-way in the axial direction. Furthermore, in the shift drum, two guide grooves with which the projecting engagement pin portions of the two shift forks are in engagement are formed in the outer peripheral surface of a drum main body in the circumferential direction.

DESCRIPTION OF THE RELATED ART

After the shift fork shaft pivotally supporting the two shift forks is installed in the transmission case for the drum-type transmission, the shift drum needs to be installed in the transmission case in a predetermined location relative to the shift fork shaft with the engagement pin portions of the two shift forks put in engagement with the two guide grooves, respectively.

It is easy to install, in the transmission case, the shift fork shaft which pivotally supports the two shift forks with the two shift forks fitted in the respective shifter members. However, the two shift forks thus pivotally supported are movable independently of each other on the shift fork shaft in the axial direction. For this reason, it is not easy to install the shift drum in the transmission case with the engagement pin portions of the two shift forks movable independently of each other put in engagement with the respective two guide grooves in the outer peripheral surface of the drum main body. A problem is with the difficulty in the installation.

Furthermore, in general, a spring configured to bias the shift forks one-way in the axial direction is installed in order that the movement of the shifter members smoothly brings the clutch teeth into mesh with each other. In this case, however, the work of installing the shift drum is more difficult because of the elastic force of the spring, and is difficult work which needs skill and experience.

SUMMARY OF THE INVENTION

The present disclosure has been made with the foregoing problems taken into consideration. A shift drum structure for a drum-type transmission is better in workability in easily installing the shift fork shaft and the shift drum in the transmission case.

A shift drum structure for a drum-type transmission (Ts) in which a shift fork (82, 83) moving on a shift fork shaft (81) in an axial direction while guided by a guide groove (91f, 91r) in response to a turn of a shift drum (90) changes speeds by sliding a shifter member (63, 66) on a transmission driving shaft (61) pivotally supporting a transmission gear (62, 65, 68), the shift drum (90) including a cylindrical drum main body (91) and drum spindles (92, 93) projecting outward from drum end walls (92w, 93w) on the respective two sides of the drum main body (91), and the guide groove (91f, 91r) formed in an outer peripheral surface of the drum main body (91) in a circumferential direction, the shift drum structure for a drum-type transmission characterized in that in the shift drum (90), a work groove (91s) is formed in the outer peripheral surface of the drum main body (91) from one end surface to an opposite end surface of the drum main body (91), or to the guide groove (91f, 91r) near the opposite end surface, the work groove (91s) oriented in the axial direction orthogonal to the guide groove (91f, 91r).

At least one of the drum end walls (92w, 93w) may not close an opening in one corresponding end surface of the work groove (91s).

The drum-type transmission (Ts) may be covered with a pair of transmission cases (41, 42) splittable in the axial direction, and in a state where an end portion of the transmission driving shaft (61) on which the transmission gear (62, 65, 68) and the shifter member (63, 66) are mounted is positioned to and supported by a predetermined bearing portion (44rh) of the one transmission case (42) with a bearing (44r) interposed in between, and concurrently in a state where an end portion of the shift fork shaft (81) on which the shift fork (82, 83) is mounted is fitted into, positioned to, and supported by a predetermined shaft hole (46rh) of the one transmission case (42) in advance, the shift drum (90) is installed by: moving the shift drum (90) in the axial direction while oriented in parallel to the shift fork shaft (81) with an engagement pin portion (82p, 83p) of the shift fork (82, 83) put in engagement with the work groove (91s) of the drum main body (91); and pivotally supporting the one drum spindle (93) by a predetermined bearing portion (47rh) of the one transmission case (42) with the a bearing (47r) interposed in between.

Further, the drum-type transmission (Ts) may be an auxiliary transmission (Ts) in a power unit (P) which includes a main transmission (Tm) and the auxiliary transmission (Ts), and of the pair of transmission cases (41, 42), the one transmission case (42) which the transmission driving shaft (61), the shift fork shaft (81) and the one drum spindle (93) of the shift drum (90) are positioned to and supported by in advance is made on the main transmission (Tm) side.

Still further, a plurality of the shift forks (82, 83) may be pivotally supported by the shift fork shaft (81) in a way that the shift forks (82, 83) are movable in the axial direction, and the shift forks (82, 83) are biased by a spring (84) in the axial direction.

According to the shift drum structure for the drum-type transmission (Ts) of the first aspect, in the shift drum (90), the work groove (91s) is formed in the outer peripheral surface of the drum main body (91) from the one end surface to the opposite end surface of the drum main body (91), or to the guide groove (91f, 91r) near the opposite end surface, in a way that the work groove (91s) is oriented in the axial direction orthogonal to the guide groove (91f, 91r).

Once the shift fork shaft (81) pivotally supported with the multiple shift forks (82, 83) fitted in the respective shifter members (63, 65) is installed in the transmission case (42), the engagement pin portions (82p, 83p) of the respective shift forks (82, 83) are arranged in a line in the axial direction. For this reason, the shift drum (90) can be positioned in parallel to the shift fork shaft (81) while the engagement pin portions (82p, 83p) arranged in a line are put in engagement with the work groove (91s) which is oriented in the axial direction. Kept in the orientation, the shift drum (90) is moved in the axial direction. Thereby, the shift drum (90) is placed in the predetermined location with the one drum spindle (93) pivotally supported by the transmission case. Subsequently, the shift forks (82, 83) are positioned in the axial direction in a way that the engagement pin portions (82p, 83p) are fitted into the respective guide grooves (91f, 91r), and the shift drum (90) is turned. Thereby, the engagement pin portions (82p, 83p) of the shift forks (82, 83) can be brought into engagement with the guide grooves (91f, 91r), respectively. Accordingly, the shift drum (90) can be easily installed, and the ease in the installation can be improved.

Even if the spring configured to bias the shift forks (82, 83) one-way in the axial direction is installed, the engagement pin portions (82p, 83p) of the shift forks (82, 83) can be easily brought into engagement with the guide grooves (91f, 91r). Accordingly, the shift drum (90) can be easily installed even by those who are not skilled workers.

According to the shift drum structure for a drum-type transmission (Ts) of the second aspect of the present invention, at least one drum end wall (93w) does not close the opening in one end surface of the work groove (91s). For this reason, the shift drum (90) can be positioned in parallel to the shift fork shaft (81) with the engagement pin portions (82p, 83p) of the shift fork (82, 83) faced to the opening which is not closed. Kept in the orientation, the shift drum (90) is moved in the axial direction. Thereby, the shift drum (90) is placed in the predetermined location with the one drum spindle (93) pivotally supported by the transmission case. Subsequently, the shift forks (82, 83) are positioned in the axial direction in a way that the engagement pin portions (82p, 83p) are fitted into the respective guide grooves (91f, 91r), and the shift drum (90) is turned. Thereby, the engagement pin portions (82p, 83p) of the shift forks (82, 83) can be brought into engagement with the guide grooves (91f, 91r), respectively. Accordingly, the shift drum (90) can be easily installed.

According to the shift drum structure for a drum-type transmission of the third aspect of the present invention, the drum-type transmission (Ts) is covered with the pair of transmission cases (41, 42) splittable in the axial direction. Furthermore, in the state where the end portion of the transmission driving shaft (61) on which the transmission gear (62, 65, 68) and the shifter member (63, 66) are mounted is positioned to and supported by the predetermined bearing portion (44rh) of the one transmission case (42) with the bearing (44r) interposed in between, and concurrently in the case where the end portion of the shift fork shaft (81) on which the shift fork (82, 83) is mounted is fitted into, positioned to, and supported by the predetermined shaft hole (46rh) of the one transmission case (42) in advance, the shift drum (90) is installed by: moving the shift drum (90) in the axial direction while oriented in parallel to the shift fork shaft (81) with the engagement pin portion (82p, 83p) of the shift fork (82, 83) put in engagement with the work groove (91s) of the drum main body (91); and pivotally supporting the one drum spindle (93) by the predetermined bearing portion (47rh) of the one transmission case (42) with the bearing (47r) interposed in between. For these reasons, with the end portion of the transmission driving shaft (61) and the end portion of the shift fork shaft (81), the end portion of the one drum spindle (93) of the shift drum (90) is easily pivotally supported by the one transmission case (42). Thereafter, the shift forks (82, 83) are positioned in the axial direction in a way that the engagement pin portions (82p, 83p) are fitted into the guide grooves (91f, 91r), and the shift drum (90) is turned. Thereby, the engagement pin portions (82p, 83p) of the shift forks (82, 83) can be easily brought into engagement with the guide grooves (91f, 91r). After that, the opposite end portion of the transmission driving shaft (61), the opposite end portion of the shift fork shaft (81) and the second drum spindle (92) of the shift drum (90) may be pivotally supported by the second transmission case (41) by assembling the second transmission case (41) with the one transmission case (42).

According to the shift drum structure for a drum-type transmission of the fourth aspect of the present invention, the drum-type transmission (Ts) is the auxiliary transmission (Ts) in the power unit (P) which includes the main transmission (Tm) and the auxiliary transmission (Ts). In addition, of the pair of transmission cases (41, 42), the one transmission case (42) which the transmission driving shaft (61), the shift fork shaft (81) and the one drum spindle (93) of the shift drum (90) are positioned to and supported by in advance is made for the main transmission (Tm). For these reasons, the final work of pivotally supporting the second drum spindle (93) of the shift drum (90) together with the opposite end portion of the transmission driving shaft (61) and the opposite end portion of the shift fork shaft (81) by assembling the second transmission case (41) with the one transmission case (42) is easy. Accordingly, the assembling of the drum-type transmission (Ts) is made easy.

According to the shift drum structure for a drum-type transmission of the fifth aspect of the present invention, the multiple shift forks (82, 83) are pivotally supported by the shift fork shaft (81) in a way that the shift forks (82, 83) are movable in the axial direction, and the shift forks (82, 83) are biased by a spring (84) in the axial direction. Despite this configuration, it is easy to face the engagement pin portions (82p, 83p) of the shift forks (82, 83) to the guide grooves (91f, 91r), respectively, by moving the engagement pin portions (82p, 83p) against the biasing force of the spring (84). Thereafter, the engagement pin portions can be easily brought into engagement with the guide grooves (91f, 91r) by turning the shift drum (90). Accordingly, the shift drum (90) can be easily installed even by those who are not skilled workers.

BRIEF DESCRIPTION OF THE DRAWINGS

The advantages of the invention will become apparent in the following description taken in conjunction with the drawings, wherein.

DETAILED DESCRIPTION OF THE INVENTION

A power unit will be described of the disclosure on the basis of FIG. 1 and FIG. 12.

A power unit P of herein described is mounted on a roofed all-terrain five-passenger four-wheel-drivable vehicle 1.

Figure 1:
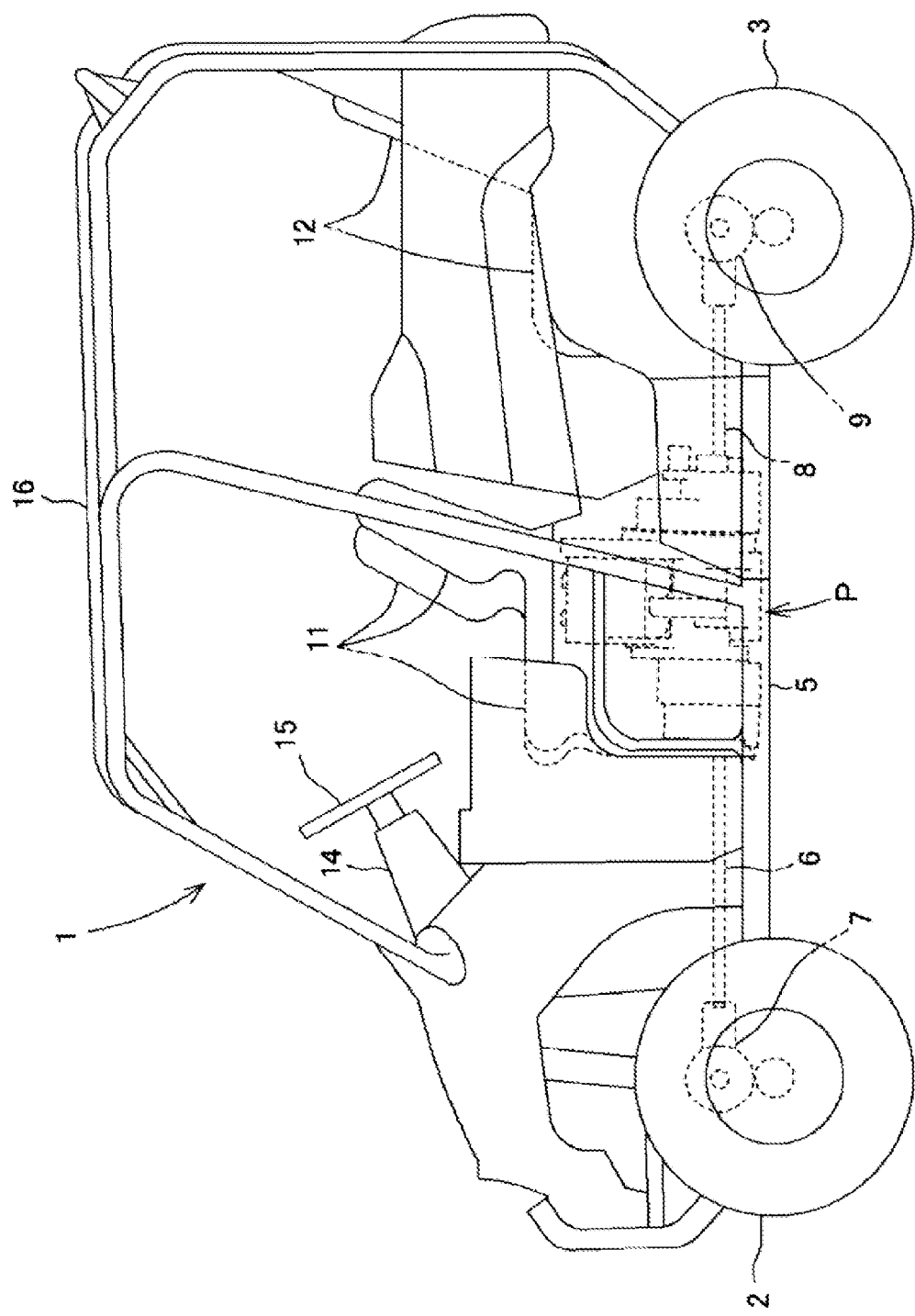
FIG. 1 is a side view of an all-terrain vehicle on which a power unit of an embodiment is mounted.

Referring to FIG. 1, in the all-terrain vehicle 1, a pair of left and right front wheels 2, 2 are suspended in the front portion of a vehicle body frame 5, while a pair of left and right rear wheels 3, 3 are suspended in the rear portion of the vehicle body frame 5. All-terrain low-pressure balloon tires are attached to the front wheels 2, 2 and the rear wheels 3, 3.

The power unit P is mounted on a center location in the vehicle body frame 5 with a crankshaft 21 of an internal combustion engine E oriented in the front-rear direction. An output shaft 71 of the power unit P projects from the power unit P in the front-rear direction. The rotary power of the output shaft 71 is transmitted from the front end of the output shaft 71 to the left and right front wheels 2, 2 via a front drive shaft 6 and a front final reduction gear unit 7, and from the rear end of the output shaft 7 to the left and right rear wheel 3, 3 via a rear drive shaft 8 and a rear final reduction gear unit 9.

It should be noted that a clutch configured to switch between the two-wheel driving mode and the four-wheel driving mode by connecting or disconnecting the transmission of the power to the front wheels is installed in the front final reduction gear unit 7.

Three front seats 11 are arranged side-by-side in the left-right direction over the power unit P, and two rear seats 12 are arranged side-by-side in the left-right direction on the rear portion of the vehicle body frame 5.

The center seat among the front seats 11 is a driver's seat, and is placed slightly ahead of the left and right seats.

A steering wheel 15 is provided in front of the driver's seat to project from a steering column 14.

The front seats 11 and the rear seats 12 are covered with a roof 16.

In the power unit P mounted on the all-terrain vehicle 1, a power transmission device 20 is made by combining a main transmission Tm and an auxiliary transmission Ts with the in-line two-cylinder water-cooled four-stroke internal combustion engine E.

Furthermore, the power unit P is mounted on the vehicle body frame 5 in a so-called vertical placement orientation in which the crankshaft 21 of the internal combustion engine E is oriented in the front-rear direction.

Figure 2:
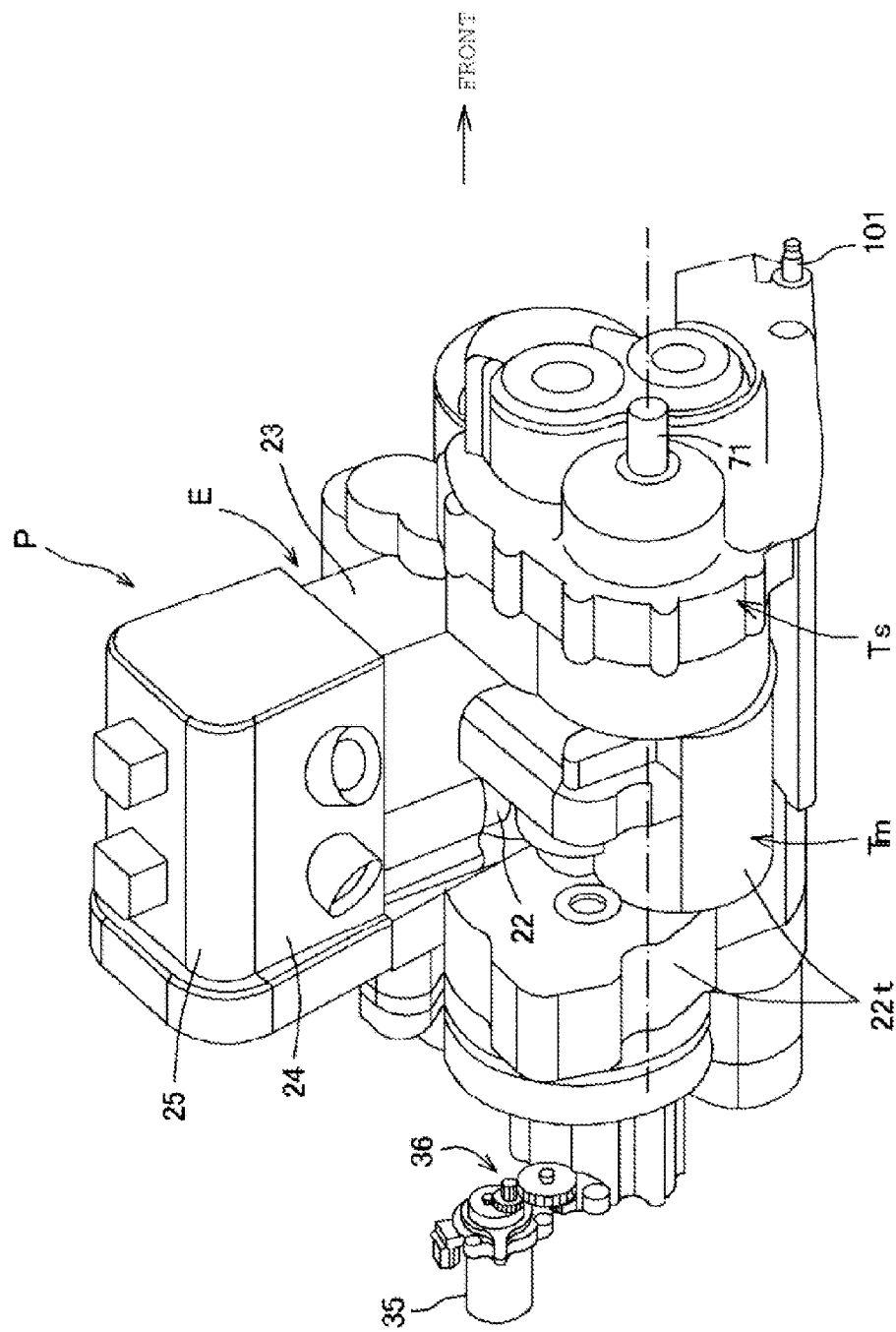
FIG. 2 is a perspective view of the whole of the power unit.
Figure 3:
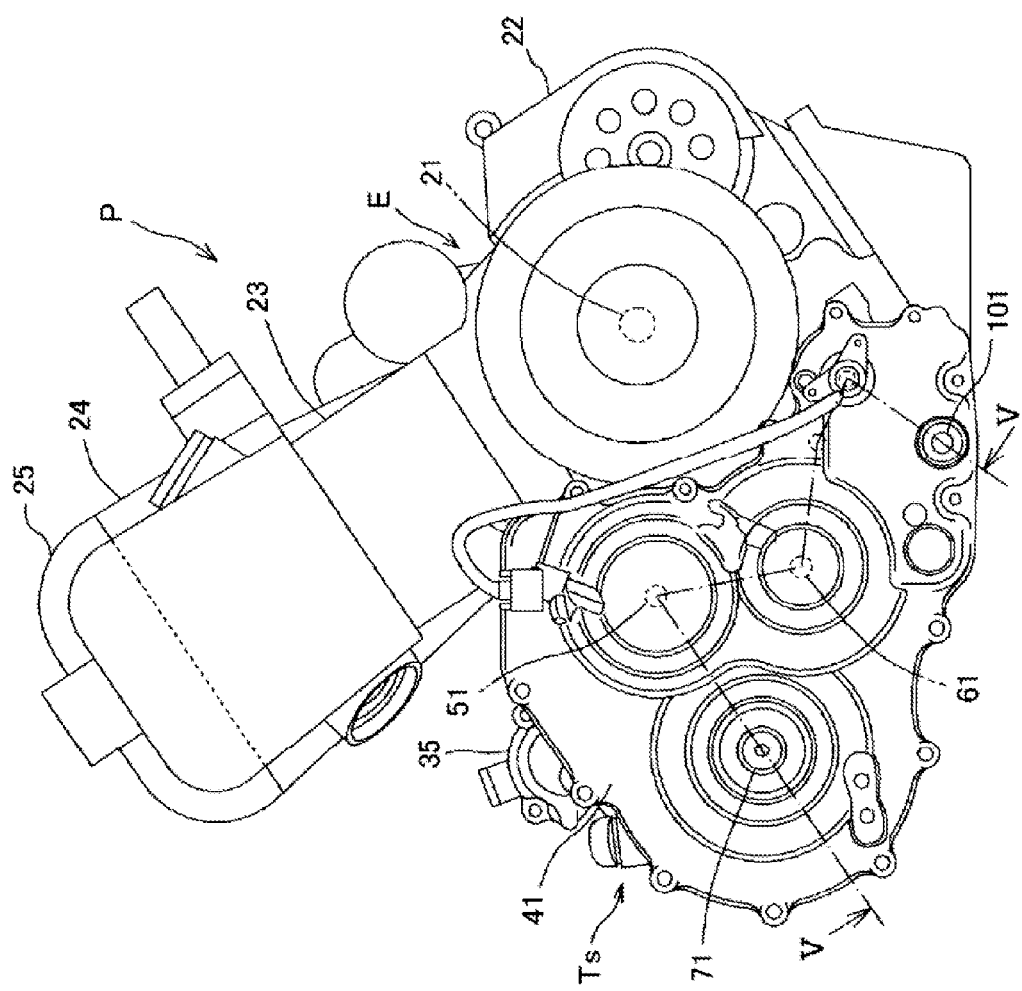
FIG. 3 is a front view of the power unit.

Referring to FIG. 2 and FIG. 3, in the power unit P, a cylinder block 23, a cylinder head 24 and a cylinder head cover 25 are sequentially stacked on the obliquely right upper portion of a crankcase 22 configured to pivotally support the crankshaft 21 of the internal combustion engine E, and project from the crankcase 22.

The crankcase 22 extends out rightward, and constitutes a main transmission case 22t configured to house the main transmission Tm.

The main transmission Tm is situated in the right of the crankshaft 21 of the internal combustion engine E. The auxiliary transmission Ts is projectingly provided to almost overlap the main transmission Tm.

Figure 4:
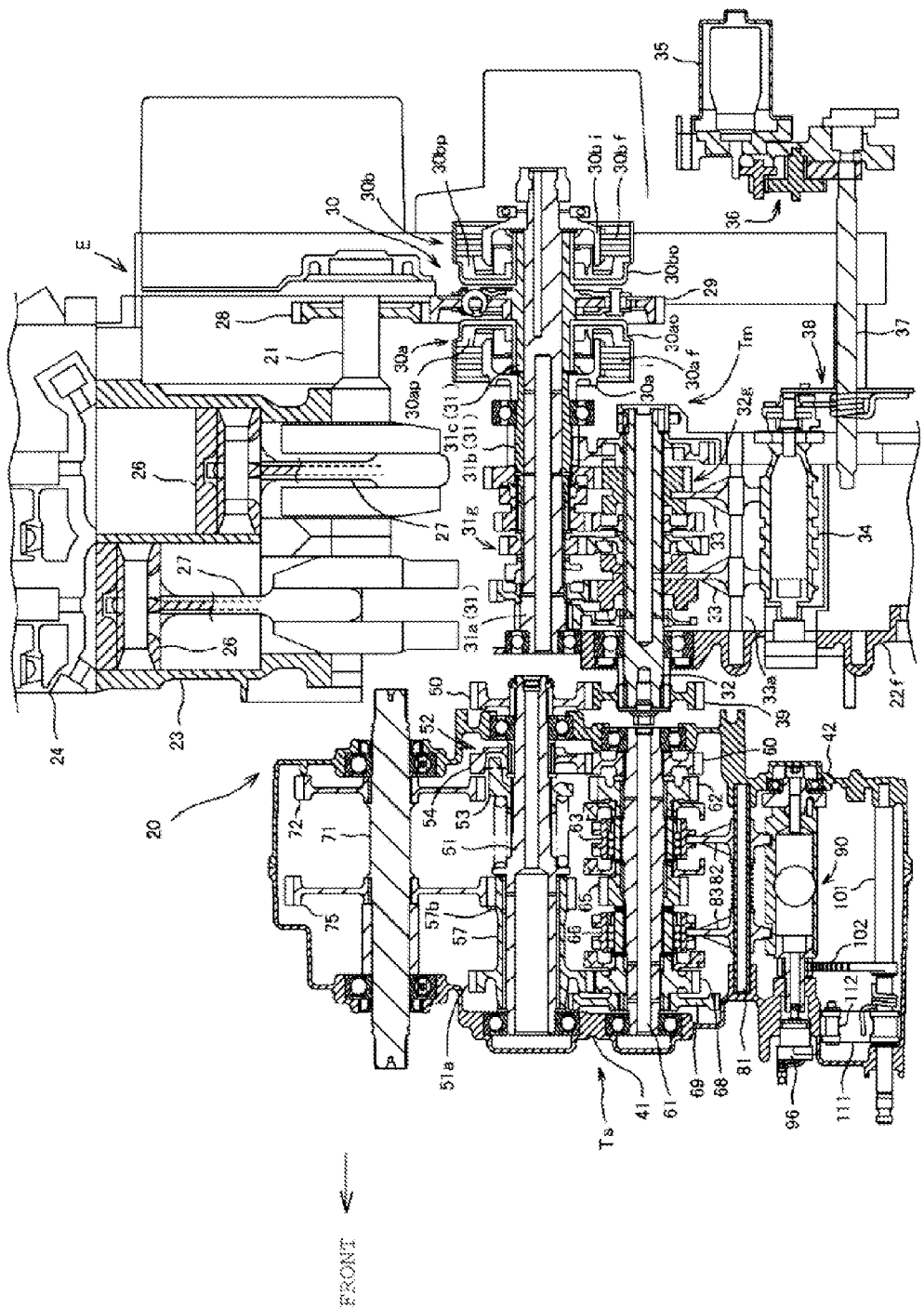
FIG. 4 is a cross-sectional view of a power transmission device, which shows the whole of a power transmission system of the power unit.

The cross-sectional view represented in FIG. 4 shows the whole of the power transmission device 20.

Two cylinders are formed in the cylinder block 23 of the internal combustion engine E in a way that two cylinders are arranged in a line in the front-rear direction. In each cylinder bore, a connecting rod 27 connects the crankshaft 21 and a piston 26 to slide therein in reciprocating manner. Thus, the connecting rod 27 outputs the power by converting the reciprocating motions of the piston 26 into the rotations of the crankshaft 21.

A primary driving gear 28 is fittingly attached to the rear end portion of the crankshaft 21 oriented in the front-rear direction.

A main shaft 31 of the main transmission Tm situated in the right of the crankshaft 21 is made by rotatably fitting a main shaft outer cylinder 31b and a clutch portion outer cylinder 31c to the outer periphery of a long main shaft inner cylinder 31a in a way that the main shaft outer cylinder 31b and the clutch portion outer cylinder 31c are arranged side-by-side in the left-right direction.

The main shaft 31 is provided with 6 driving transmission gears 31g. A counter shaft 32 is provided with 6 driven transmission gears 32g which correspond to and are always in mesh with the respective 6 driving transmission gears 31g.

The driving transmission gear 31g in the odd shift steps are provided to the main shaft inner cylinder 31a, while the driving transmission gear 31g in the even shift steps are provided to the main shaft outer cylinder 31b.

A pair of twin clutches 30 including one clutch 30a and a second clutch 30b are made on the clutch portion outer cylinder 31c. A primary driven gear 29 is provided at the center of the clutch portion outer cylinder 31c by spline fitting, while clutch outers 30ao, 30bo of the first and second clutches 30a, 30b are provided to the two respective sides of the primary driven gear 29 by spline fitting. The movements of the primary driven gear 29 and the clutch outers 30ao, 30bo in the axial direction are restricted.

The primary driven gear 29 at the center is in mesh with the primary driving gear 28 provided to the crankshaft 21.

In addition, a clutch inner 30ai of the first clutch 30a is spline-fitted to the main shaft inner cylinder 31a while its movement in the axial direction is restricted. A clutch inner 30bi of the second clutch 30b is spline-fitted to the main shaft outer cylinder 31b while its movement in the axial direction is restricted.

A pressure plate 30ap (30bp) is capable of pressing a friction plate group 30af (30bf) in which driving friction plates on the side of the clutch outers 30ao (30bo) to rotate with the clutch outers 30ao (30bo) and driven friction plates on the side of the clutch inners 30ai (30bi) to rotate with the clutch inners 30ai (30bi) are arranged in an alternate series.

A hydraulic pressure circuit configured to selectively drive the pressure plates 30ap, 30bp is formed through the main shaft inner cylinder 31a, the clutch portion outer cylinder 31c and a right crankcase cover.

Once the pressure plate 30ap is driven and the pressure is thus applied to the friction plate group 30af, the first clutch 30a is connected, and the power inputted into the primary driven gear 29 is transmitted to the main shaft inner cylinder 31a. Thereby, the driving transmission gears 31g in the odd shift steps rotate.

On the other hand, once the pressure plate 30bp is driven and the pressure is thus applied to the friction plate group 30bf, the second clutch 30b is connected, and the power inputted into the primary driven gear 29 is transmitted to the main shaft outer cylinder 31b. Thereby, the driving transmission gears 31g in the even shift steps rotate.

Two of the 6 driving transmission gears 31g pivotally supported by the main shaft 31 are shifter gears slidable in the axial direction, while two of the 6 driven transmission gears 32g pivotally supported by the counter shaft 32 are shifter gears slidable in the axial direction.

Shift forks 33, 33 configured to move the two shifter gears on the counter shaft 32 is provided by being pivotally supported by a shift fork shaft 33a.

Shift forks 33, 33 configured to move the two shifter gears on the main shaft 31, and the corresponding shift fork shaft are also provided, although not illustrated.

Due to the turn of a shift drum 34, the four shift forks 33 move while guided by a guide groove formed in the outer peripheral surface, and changes the mesh among the gears for the purpose of effective power transmission.

The shift drum 34 is turned by a transmission motor 35.

The driving force of the transmission motor 35 is transmitted to the turn of a shift spindle 37 via a speed reducing gear mechanism 36, and the turn of the shift spindle 37 is transmitted to the turn of the shift drum 34 via an intermittent feeding mechanism 38.

For these reasons, the main transmission Tm is capable of changing speeds by smoothly switching the shift steps, inclusive of the first to sixth speeds, through the control of the hydraulic pressure applied to the twin clutches 30 and the control of the drive of the transmission motor 35.

The output shaft of the main transmission Tm is the counter shaft 32. The counter shaft 32 penetrates frontward through a front side wall 22f of the crankcase 22, and a main transmission output gear 39 is fittingly attached to the projecting front end of the counter shaft 32.

In the power unit P, the auxiliary transmission Ts is provided in front of the main transmission Tm. The auxiliary transmission Ts is formed in the inside of a case made from a front auxiliary transmission case 41 and a rear auxiliary transmission case 42 which are split in the front-rear direction.

The auxiliary transmission Ts includes a cam-type torque damper 52.

Figure 5:
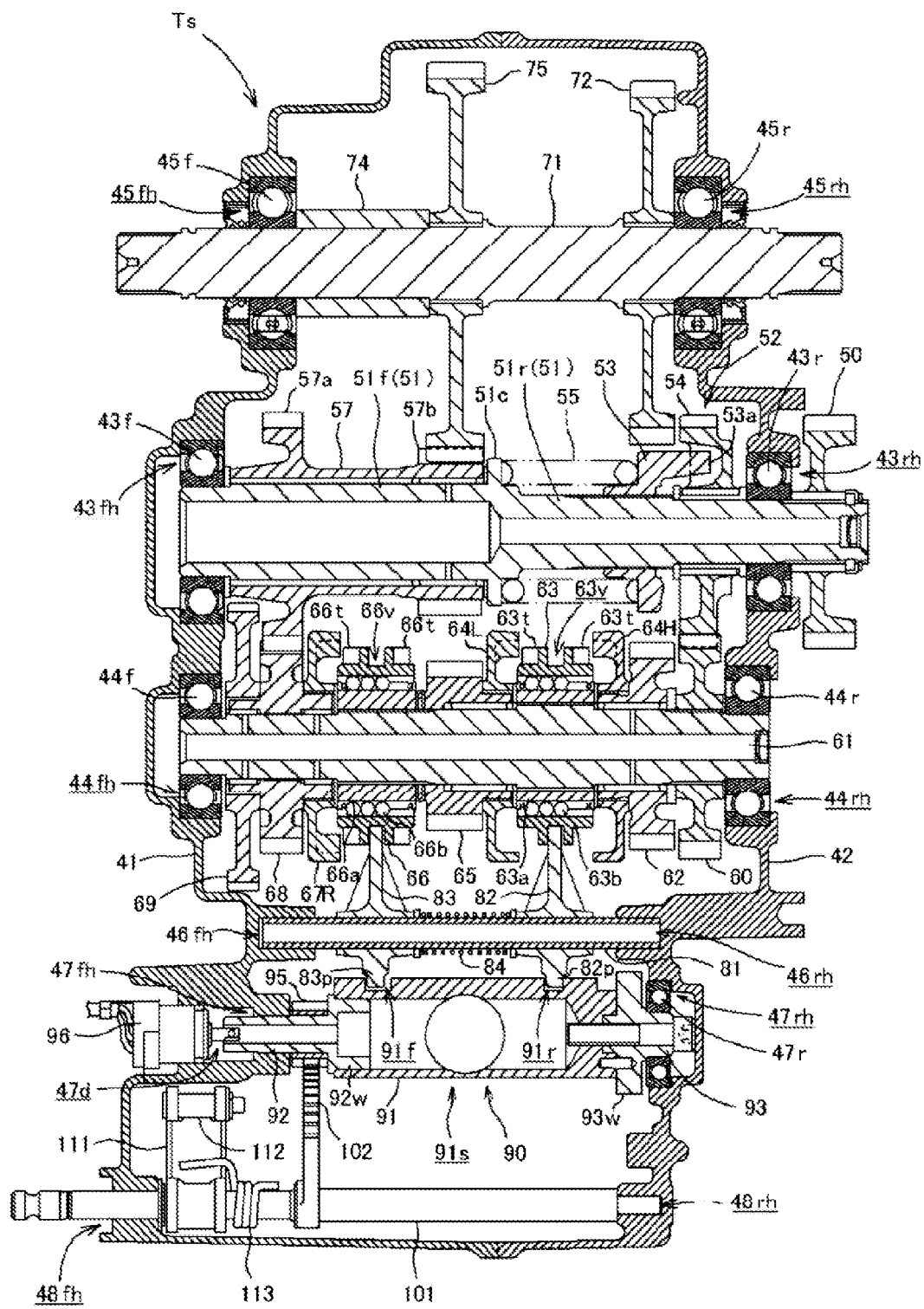
FIG. 5 is a cross-sectional view of an auxiliary transmission taken along the V-V line of FIG. 3 and FIG. 6.

FIG. 5 is a cross-sectional view showing the structure of the auxiliary transmission Ts. Rotating spindles of the auxiliary transmission Ts, inclusive of a transmission driving shaft 61 and the transmission driven shaft 71 with their transmission gears in mesh with each other, and a damper shaft 51 supporting the cam-type torque damper 52, are installed in parallel with the crankshaft 21 while oriented in the front-rear direction, and with the front and rear ends of the spindles pivotally supported, respectively, by the front auxiliary transmission case 41 and the rear auxiliary transmission case 42.

Figure 6:
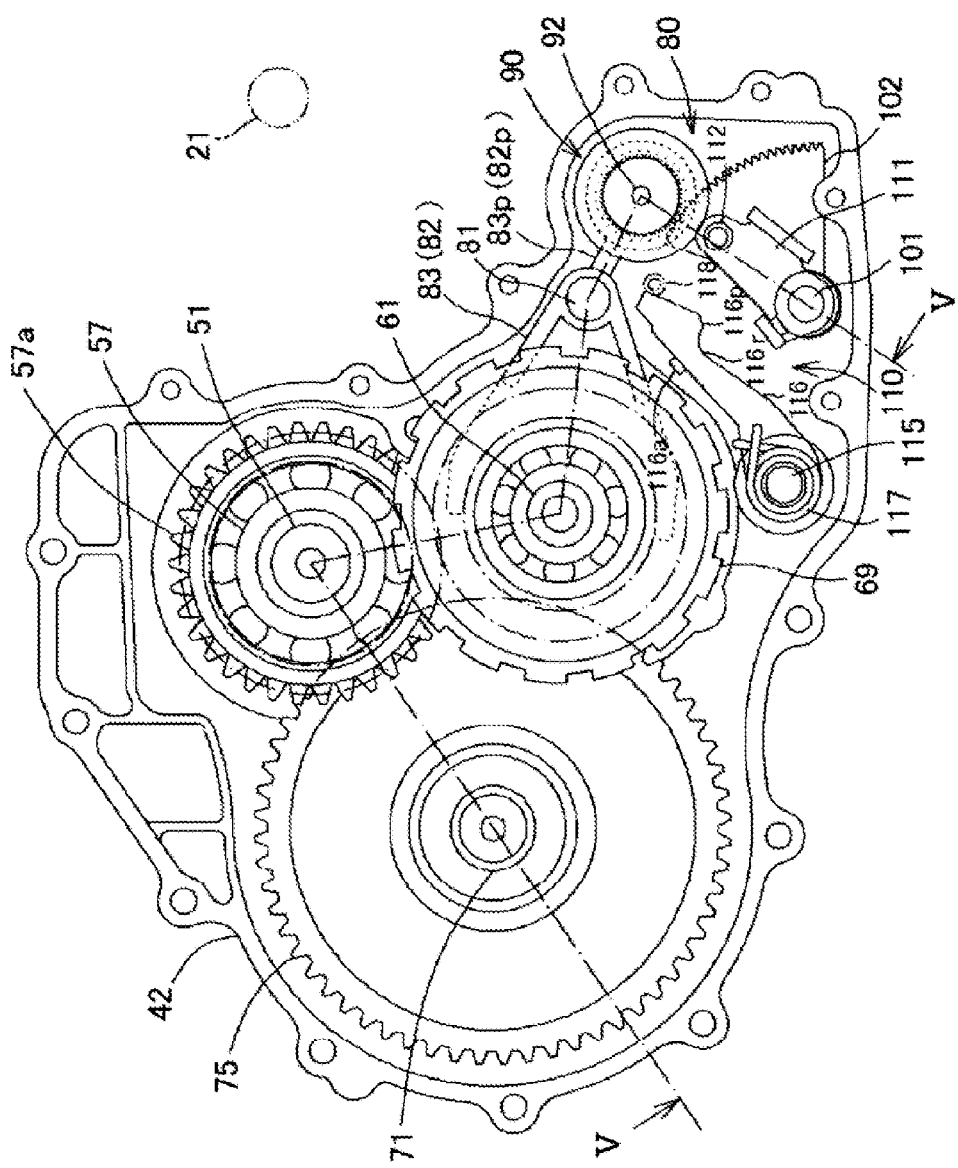
FIG. 6 is a front view of the auxiliary transmission in a high-speed running state, from which a front auxiliary transmission case is detached.

The damper shaft 51 is an input shaft of the auxiliary transmission Ts, and is placed above the center of the auxiliary transmission Ts in the left-right widthwise direction (see FIG. 6). As shown in FIG. 5, a front damper shaft 51f ahead of a center flange 51c is larger in outer diameter than a rear damper shaft 51r in the rear of the center flange 51c. The damper shaft 51 is rotatably installed while: the front end of the front damper shaft 51f is pivotally supported by a bearing 43f fitted in a bearing recess portion 43fh of the front auxiliary transmission case 41; and the rear portion of the rear damper shaft 51r is pivotally supported by a bearing 43r fitted in a bearing hole 43rh of the rear auxiliary transmission case 42.

The rear damper shaft 51r penetrates through the bearing 43r, and projects rearward. An auxiliary transmission input gear 50 is fittingly attached to the projecting rear end portion of the rear damper shaft 51r.

The auxiliary transmission input gear 50 is in mesh with the main transmission output gear 39, and the output of the main transmission Tm is thus inputted into the auxiliary transmission input gear 50 of the auxiliary transmission Ts.

The cam-type torque damper 52 is provided to the rear damper shaft 51r.

The rear damper shaft 51r is provided with a cam member 53 and a cam follower gear member 54. The cam member 53 is spline-fitted to the rear damper shaft 51r, and pivotally supported by the rear damper shaft 51r while slidable in the axial direction with the relative rotation of the cam member 53 restricted. Opposed to the rear of the cam member 53, the cam follower gear member 54 is pivotally supported by the rear damper shaft 51r while rotatable relative to the rear damper shaft 51r with the movement of the cam follower gear member 54 in the axial direction restricted.

Faced to the cam follower gear member 54, a cam protrusion 53a having an inclining cam surface is projectingly formed in the cam member 53.

The cam follower gear member 54 has a recess portion which is in contact with the cam surface of the cam protrusion 53a of the cam member 53. In addition, a gear is formed in the outer peripheral portion of the cam follower gear member 54.

The cam member 53 is biased by a coil spring 55, which is installed between the cam member 53 and the flange 51c, toward the cam follower gear member 54 in the rear of the cam member 53. Thereby, the cam surface of the cam protrusion 53a of the cam member 53 is in contact with the recess portion of the cam follower gear member 54.

For this reason, even in a case where the torque inputted into the damper shaft 51 from the auxiliary transmission input gear 50 increases or decreases sharply, a buffer effect works between the cam member 53 and the cam follower gear member 54 of the cam-type torque damper 52, and accordingly suppresses the influence on the transmission mechanism in the area downstream of the cam follower gear member 54. This makes it possible to change speeds smoothly.

An intermediate cylindrical gear member 57 is pivotally supported by the front damper shaft 51f in a way that the intermediate cylindrical gear member 57 is rotatable relative to the front damper shaft 51f.

A large-diameter idle gear 57a and a small-diameter idle gear 57b are integrally formed on the intermediate cylindrical gear member 57 in the front-rear direction.

Of the transmission driving shaft 61 and the transmission driven shaft 71 with their transmission gears in mesh with each other in the auxiliary transmission Ts, the transmission driving shaft 61 is arranged below and in parallel to the damper shaft 51, and in the same location in the axial direction (see FIG. 5 and FIG. 6).

As shown in FIG. 5, the transmission driving shaft 61 is rotatably installed while: its front end is pivotally supported by a bearing 44f fitted in a bearing recess portion 44fh in the front auxiliary transmission case 41; and its rear end is pivotally supported by a bearing 44r fitted in a bearing hole 44rh in the rear auxiliary transmission case 42:

Along the bearing 44r, a driving shaft input gear 60 is provided in a fixed location by spline-fitting on the rear portion of the transmission driving shaft 61. The driving shaft input gear 60 is in mesh with the cam follower gear member 54 which is pivotally supported by the damper shaft 51. The driving force transmitted via the cam-type torque damper 52 is inputted into the transmission driving shaft 61.

A high-speed driving gear 62 is rotatably supported by the transmission driving shaft 61 while being adjacent to the front side of the driving shaft input gear 60 on the rear portion of the transmission driving shaft 61. A low-speed driving gear 65 is rotatably supported by the center portion of the transmission driving shaft 61. A reverse driving gear 68 is rotatably supported by the front portion of the transmission driving shaft 61.

A high/low speed changing clutch mechanism made from a high/low speed changing shifter member 63 is provided between the high-speed driving gear 62 and the low-speed driving gear 65.

The high/low speed changing shifter member 63 is pivotally supported by the outer periphery of a cylinder base portion 63a, which is spline-connected to the transmission driving shaft 61 at a predetermined location in the axial direction, with a linear motion bearing 63b interposed in between, in a way that the high/low speed changing shifter member 63 is movable in the axial direction. A shift fork groove 63v is formed between clutch teeth 63t, 63t which are formed directed frontward and rearward, respectively.

Opposed to the rear clutch tooth 63t, a clutch receiving member 64H is provided by being fittingly attached to the high-speed driving gear 62. Opposed to the front clutch tooth 63t, a clutch receiving member 64L is fittingly attached to the low-speed driving gear 65.

Accordingly, once the high/low speed changing shifter member 63 moves rearward, the rear clutch tooth 63t comes into mesh with the clutch receiving member 64H fittingly attached to the high-speed driving gear 62, and rotates the high-speed driving gear 62 with the transmission driving shaft 61. Once the high/low speed changing shifter member 63 moves frontward, the front clutch tooth 63t comes into mesh with the clutch receiving member 64L fittingly attached to the low-speed driving gear 64, and rotates the lower-speed driving gear 64 with the transmission driving shaft 61.

When the high/low speed changing shifter member 63 is situated in the middle between the clutch receiving members 64H, 64L while in mesh with neither of the clutch receiving members 64H, 64L, the rotations of the transmission driving shaft 61 are transmitted to neither the high-speed driving gear 62 nor the low-speed driving gear 64.

On the other hand, a forward/rearward movement switching clutch mechanism made from a forward/rearward movement switching shifter member 66 is provided between the low-speed driving gear 65 and the reverse driving gear 68.

Like the high/low speed changing shifter member 63, the forward/rearward movement switching shifter member 66 is pivotally supported by the outer periphery of a cylinder base portion 66a, which is spline-connected to the transmission driving shaft 61 at a predetermined location in the axial direction, with a linear motion bearing 66b interposed in between, in a way that the forward/rearward movement switching shifter member 66 is movable in the axial direction. A shift fork groove 66v is formed between clutch teeth 66t, 66t which are formed directed frontward and rearward, respectively.

Opposed to the front clutch tooth 66t of the forward/rearward movement switching shifter member 66, a clutch receiving member 67R is provided by being fittingly attached to the reverse driving gear 68.

Nothing is in mesh with the rear clutch tooth 66t of the forward/rearward movement switching shifter member 66.

For this reason, when the forward/rearward movement switching sifter member 66 is situated rearward, nothing is in mesh with the rear clutch tooth 66t, and the rotations of the transmission driving shaft 61 are transmitted nowhere via the forward/rearward movement switching shifter member 66. Accordingly, the rotations of the transmission driving shaft 61 are only transmitted to either the high-speed driving gear 62 or the low-speed driving gear 64 for the forward movement via the high/low speed changing shifter member 63.

Once the frontward/rearward movement switching shifter member 66 moves forward, the front clutch tooth 66t comes into mesh with the clutch receiving member 67R fittingly attached to the reverse driving gear 68, and rotates the reverse driving gear 68 with the transmission driving shaft 61.

The reverse driving gear 68 is in mesh with the large-diameter idle gear 57a of the intermediate cylindrical gear member 57 pivotally supported by the damper shaft 51 in a way that the intermediate cylindrical gear member 57 is rotatable relative to the damper shaft 51.

In addition, a parking gear 69 is provided adjacent to the front side of the reverse driving gear 68 in the rear of the bearing 44f, which pivotally supports the front end of the transmission driving shaft 61, by being fittingly attached to the reverse driving gear 68.

The transmission driven shaft 71 is arranged in parallel to the transmission driving shaft 61 in the right (the left in the front view of FIG. 6) of the damper shaft 51 and the transmission driving shaft 61 which are arranged in the vertical direction in the center of the auxiliary transmission Ts in the left-right widthwise direction.

As shown in FIG. 5, the transmission driven shaft 71 is rotatably installed with its front and rear ends projecting in the front-rear direction while: its front portion is pivotally supported by a bearing 45f, which is fitted in a bearing hole 45fh of the front auxiliary transmission case 41, with the front portion penetrating through the bearing 45f; and its rear portion is pivotally supported by a bearing 45r, which is fitted in a bearing hole 45rh of the rear auxiliary transmission case 42, with the rear portion penetrating through the bearing 45r.

Along the bearing 45r, a high-speed driven gear 72 is provided in a predetermined location on the rear portion of the transmission driven shaft 71 by spline-fitting. A low-speed driven gear 75 is provided by spline-fitting in a predetermined location in the center portion of the transmission driven shaft 71 with a collar member 74 interposed between the predetermined location and the front bearing 45f.

For these reasons, the high-speed driven gear 72 and the low-speed driven gear 75 rotate integrally with the transmission driven shaft 71 in the predetermined location in the axial direction.

The high-speed driven gear 72 and the low-speed driven gear 75 are always in mesh with the high-speed driving gear 62 and the low-speed driving gear 65 which are rotatably supported by the transmission driving shaft 61, respectively.

In addition, the low-speed driven gear 75 is also in mesh with the small-diameter idle gear 57b of the intermediate cylindrical gear member 57 which is pivotally supported by the damper shaft 51 in a way that the intermediate cylindrical gear member 57 is rotatable relative to the damper shaft 51.

Accordingly, the reverse driving gear 68 on the transmission driving shaft 61 is capable of: converting the direction of its rotations into the rearward movement direction by means of the large-diameter idle gear 57a and the small-diameter idle gear 57b of the intermediate cylindrical gear member 57; transmitting the rearward movement direction to the low-speed driven gear 75; and thus rotating the transmission driven shaft 71 in the rearward movement direction.

The transmission driven shaft 71 is the output shaft of the auxiliary transmission Ts which penetrates through the front auxiliary transmission case 41 and the rear auxiliary transmission case 42 of the auxiliary transmission Ts in the front-rear direction while projecting its front and rear ends in the front-rear direction. The transmission driven shaft 71 is also the output shaft 71 of the power unit P.

In other words, the front end of the transmission driven shaft (output shaft) 71 is connected to the front drive shaft 6, while the rear end of the transmission driven shaft 71 is connected to the rear drive shaft 8. Thereby, the driving power is transmitted to the front wheels 2, 2 and the rear wheels 3, 3.

A transmission driving mechanism 80 configured to move the high/low speed changing shifter member 63 and the forward/rearward movement switching shifter member 66 on the transmission driving shaft 61 in the axial direction is provided on the left side of the transmission driving shaft 61 (in the right in FIG. 6), that is to say, closer to the crank shaft 21.

A shift fork shaft 81 is installed with the front and rear ends of the shift fork shaft 81 respectively fitted in shaft holes 46*fh*, 46*rh* of the front auxiliary transmission case 41 and the rear auxiliary transmission case 42. The shift fork shaft 81 penetrates through and pivotally supports a shift fork 82, which is fitted in the shift fork groove 63*v* of the high/low speed changing shifter member 63, and a shift fork 83, which is fitted in the shift fork groove 66*v* of the forward/rearward movement switching shifter member 66, in a way that the shift fork 82 and the shift fork 83 are slidable in the axial direction.

A coil spring 84 is installed between the front and rear shift forks 83, 82, as well as biases the shift fork 82 and the shift fork 83 in directions in which the shift fork 82 and the shift fork 83 go away from each other. This makes smooth the mesh of the clutch tooth of each of the shifter members 63, 66 which are moved by the shift forks 82, 83.

A shift drum 90 is provided in a location more leftward of the shift fork shaft 81.

Figure 8:
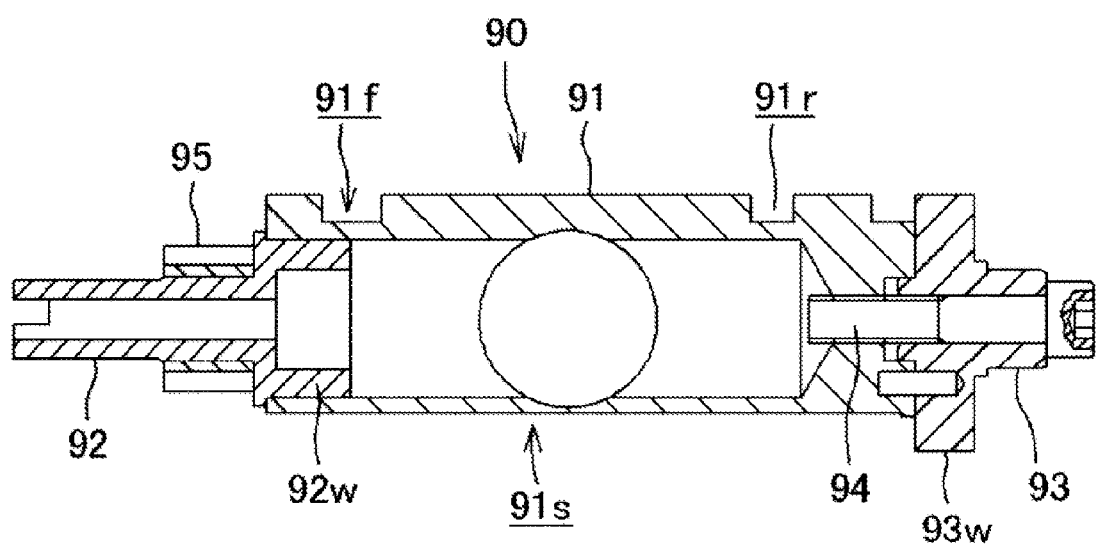
FIG. 8 is a cross-sectional view of a shift drum.
Figure 9:
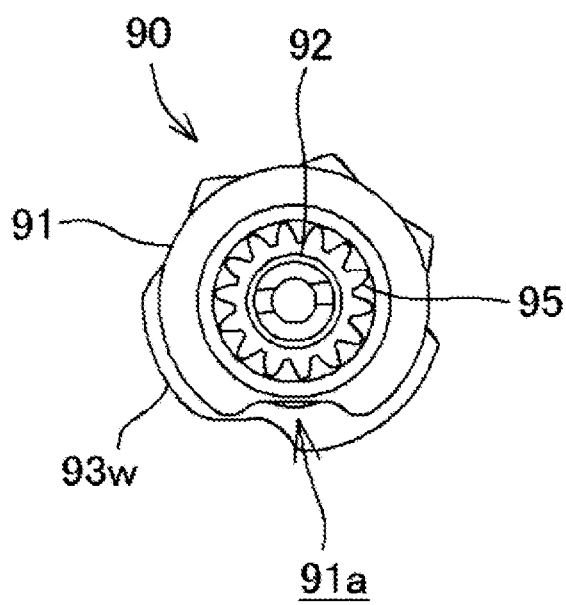
FIG. 9 is a front view of the shift drum.
Figure 10:
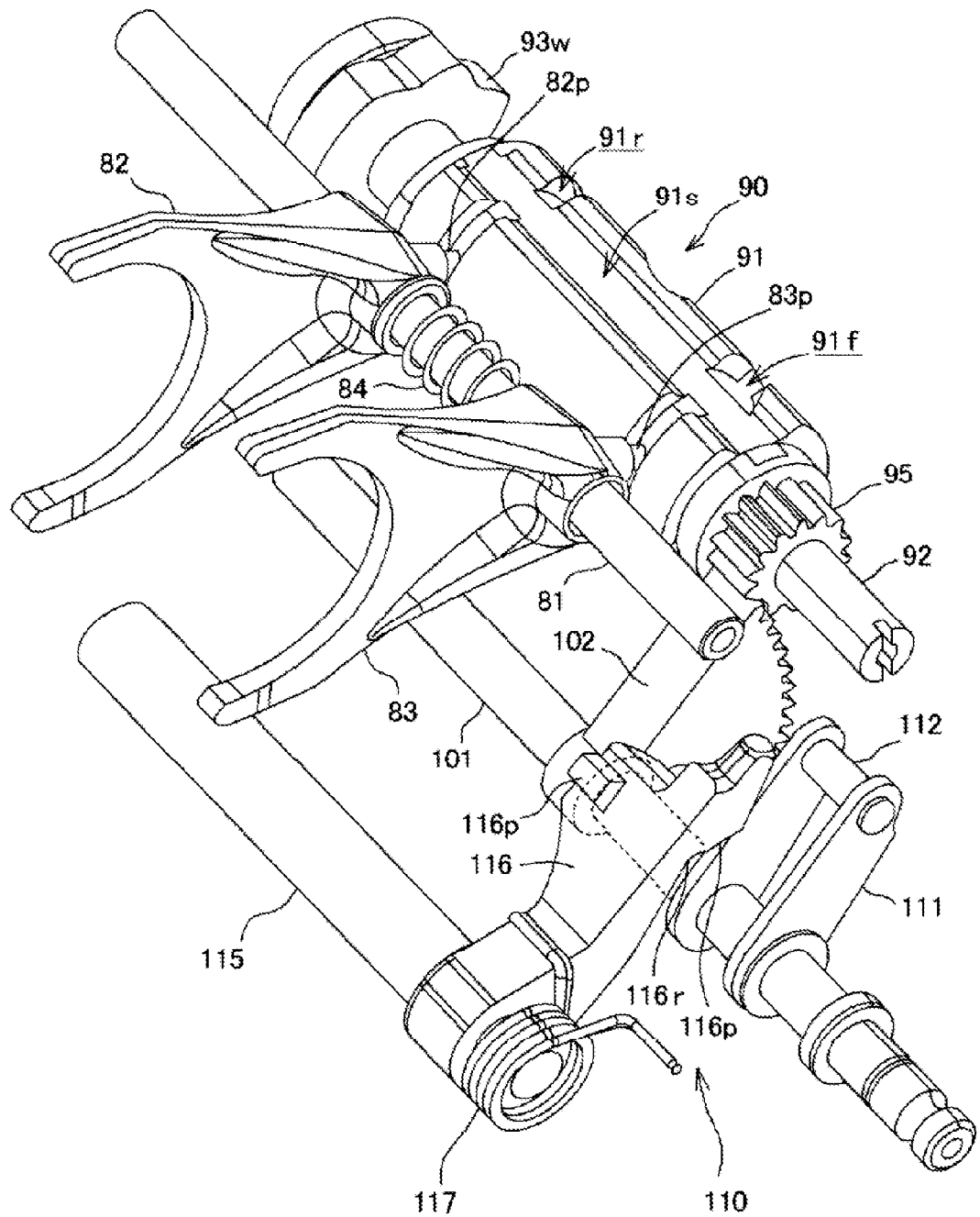
FIG. 10 is a perspective view showing a part of a transmission driving mechanism and a part of a parking mechanism.

As shown in FIG. 8 and FIG. 10, the shift drum 90 is provided with drum spindles 92, 93 projecting from the front and rear ends of a cylindrical drum main body 91 on the axis in the front-rear direction.

The front drum spindle 92 is attached by fitting a drum end wall 92*w*, which is an enlarged-diameter portion in the rear end of the drum spindle 92, in the front-end opening of the drum main body 91. In the rear drum spindle 93, a drum end wall in its front end forms a flower-shaped cam portion 93*w* whose outer periphery is a projecting and recessing cam surface. The rear drum spindle 93 is connected to the rear end portion of the drum main body 91 by use of a pin member 94.

It should be noted that a shift drum input gear 95 is fittingly attached to the drum spindle 92 which extends long from the drum end wall 92*w*.

Guide grooves 91*f*, 91*r* each in a predetermined shape in the circumferential direction are formed in the respective front and rear portions of the outer peripheral surface of the drum main body 91. Engagement pin portions 82*p*, 83*p* projectingly formed on the shift forks 82, 83 in the same direction slidably engage with the guide grooves 91*f*, 91*r*. The speed change is carried out by the shift forks 82, 83 which are moved in the axial direction by the rotations of the shift drum 90 while guided by the respective guide grooves 91*f*, 91*r*, and thus move the high/low speed changing shifter member 63 and the frontward/rearward movement switching shifter member 66.

A work groove 91*s*, which is directed in an axial direction orthogonal to the guide grooves 91*f*, 91*r* formed in the circumferential direction of the drum main body 91, is formed extending from one end surface to the opposite end surface in the outer peripheral surface of the drum main body 91.

As described later, the work groove 91*s* is used when the transmission driving mechanism 80 is assembled.

It should be noted that the drum end wall 92*w* of the drum spindle 92 is fitted in the front-end opening of the drum main body 91, and is open without closing the front-end opening of the work groove 91*s*.

As shown in FIG. 5, the foregoing shift drum 90 is rotatably installed with the front drum spindle 92 penetrating through and pivotally supported by a shaft hole 47*fh* of the front auxiliary transmission case 41, and with the rear drum spindle 93 pivotally supported by a bearing 47*r* which is fitted in a bearing recess portion 47*rh* of the rear auxiliary transmission case 42.

A recess portion 47*d* is formed in the front auxiliary transmission case 41 in a location more frontward of the shaft hole 47*fh*. A shift position sensor 96 is fitted in and supported by the recess portion 47*d*. The driving shaft of the shift position sensor 96 is coaxially connected to the drum spindle 92. The rotational angle of the shift drum 90 is detected by the shift position sensor 96.

Referring to FIG. 5, a shift spindle 101 is rotatably installed below the shift fork shaft 81 with the front end of the shift spindle 101 penetrating through a shaft hole 48*fh* of the front auxiliary transmission case 41, and with the rear end of the shift spindle 101 fitted in a shaft hole 48*rh* of the rear auxiliary transmission case 42.

The shift spindle 101, which projects frontward from the front auxiliary transmission case 41, turns when manual shift operation works on the front end of the shift spindle 101.

A gear shift arm 102 shaped like a fan is fittingly attached to the shift spindle 101 in a predetermined location. The gear shift arm 102 is in mesh with the shift drum input gear 95 which is fittingly attached to the drum spindle 92 of the shift drum 90.

In addition, a parking operation arm 111 is pivotally supported by the spindle shaft 101 in a way that the parking operation arm 111 is swingable along the shaft hole 48*fh* of the front auxiliary transmission case 41. A torsion spring 113 is installed between the shift spindle 101 and the parking operation arm 111. The turn of the shift spindle 101 is transmitted to the swing of the parking operation arm 111 via the torsion spring 113.

A roller 112 is rotatably supported by the extremity of the parking operation arm 111.

Referring to FIG. 6, on the right side of the shift spindle 101 and below the transmission driving shaft 61, the lever spindle 115 is installed oriented in the front-rear direction with its front and rear ends respectively supported by the front auxiliary transmission case 41 and the rear auxiliary transmission case 42. A parking lock lever 116 whose base end is pivotally supported by the lever spindle 115 is swingably supported.

Referring to FIG. 6 which is its front view, a parking lock lever 116 is situated in the same location in the front-rear direction as is the parking gear 69 pivotally supported by the transmission driving shaft 61. The parking lock lever 116 is provided extending from its base end portion pivotally supported by a lever spindle 115, and obliquely upward through the interstice between the parking gear 69 and the parking operation arm 111.

The parking lock lever 116 is biased by a torsion spring 117, which is wound around the lever spindle 115, in the clockwise direction in the front view. The swing of the parking lock lever 116 is restricted by the contact of the extremity of the parking lock lever 116 with a stopper 118 which is projectingly provided in a predetermined location from the front auxiliary transmission case 41.

A lock protrusion 116*a* is projectingly formed around a portion of the parking lock lever 116 which faces the parking gear 69. A parking inclined surface 116*p* and a reverse recess surface 116*r*, with which a roller 112 in the extremity of the parking operation arm 111 comes into contact, are formed around an opposite-side portion of the parking lock lever 116 which faces the parking operation arm 111 (see FIG. 6 and FIG. 7).

The parking operation arm 111, the parking lock lever 116 and the parking gear 69 jointly constitutes a parking mechanism 110.

FIG. 6 shows the auxiliary transmission Ts in a frontward high-speed running state. The parking lock lever 116 which is biased by the torsion spring 117 stops away from the parking gear 69 while in contact with the stopper 118.

Once the turn of the shift spindle 101 swings the parking operation arm 111, the roller 112 in the extremity of the parking operation arm 111 comes into contact with and rolls on the parking inclined surface 116p of the parking lock lever 116. Thereafter, the parking operation arm 111 swings the parking lock lever 116, and the lock protrusion 116a of the parking lock lever 116 is pressed by the parking gear 69. Thus, the lock protrusion 116a is fitted into one of the grooves between the teeth of the parking gear 69, and is accordingly locked into the parking gear 69 and restricts the rotation of the parking gear 69.

Figure 7:
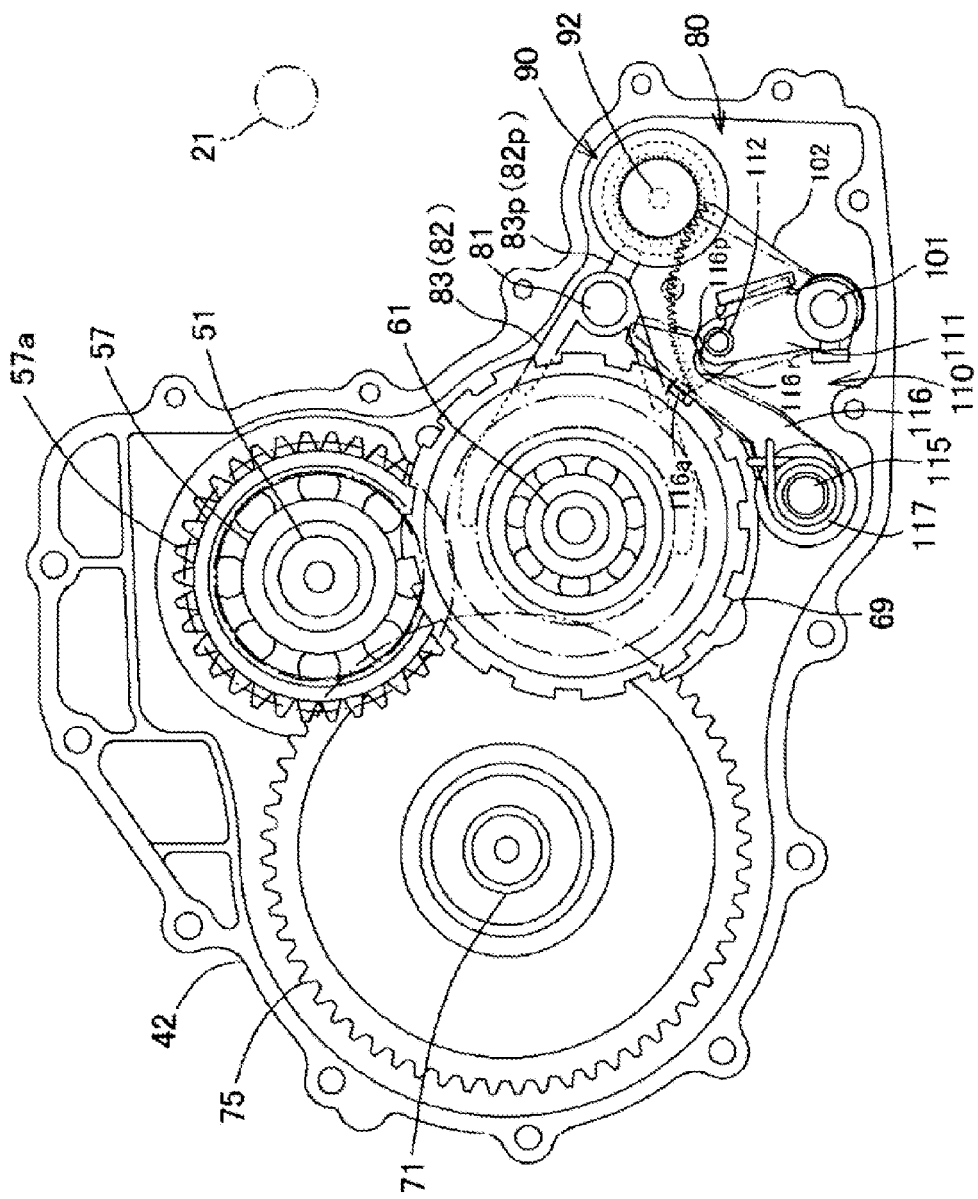
FIG. 7 is a front view of the auxiliary transmission in a parking state, from which the front auxiliary transmission case is detached.

FIG. 7 shows the parking state in which the rotation of the parking gear 69 is prohibited.

To put it specifically, referring to FIG. 5, once the rotation of the parking gear 69 is prohibited, the rotation of the reverse driving gear 68 integral with the parking gear 69 is restricted simultaneously. This also restricts the rotation of the large-diameter idle gear 57a in mesh with the reverse driving gear 68; the rotations of the intermediate cylindrical gear member 57 and the small-diameter idle gear 57b which are integral with the large-diameter idle gear 57a; and the rotation of the low-speed driven gear 75 in mesh with the small-diameter idle gear 57b. This restriction fixes the transmission driven shaft 71 which is the output shaft, and to which the low-speed driven gear 75 is fittingly attached. Thereby, the parking state is established.

It should be noted that as indicated with chain double-dashed lines in FIG. 7, once the parking operation arm 111 further swings from the parking state, the roller 112 in the extremity of the parking operation arm 111 is fitted into the reverse recess surface 116r of the parking lock lever 116; the parking lock lever 116 is swung by the biasing force of the torsion spring 117; the parking lock lever 116 thus goes away from the parking gear 69; the lock of the lock protrusion 116a is released; and the parking state is accordingly released. Thereby, the reverse state is established.

In the reverse state, the turn of the shift drum 90 brings the frontward/rearward movement switching shifter member 66 into mesh with the clutch receiving member 67R, and the frontward/rearward movement switching shifter member 66 transmits the rotation of the transmission driving shaft 61 to the reverse driving gear 68. The rotation of the transmission driving shaft 61 is also transmitted to: the large-diameter idle gear 57a in mesh with the reverse driving gear 68; the intermediate cylindrical gear member 57 and the small-diameter idle gear 57b which are integral with the large-diameter idle gear 57a; and the low-speed driven gear 75 in mesh with the small-diameter idle gear 57b. Accordingly, the rotation of the transmission driving shaft 61 is further transmitted to the transmission driven shaft (output shaft) 71 as a reverse rotation via the intermediate cylindrical gear member 57.

Once the shift spindle 101 is manually turned from the parking state shown in FIG. 7 in the clockwise direction in the front view shown in FIG. 7, the auxiliary transmission Ts establishes the low-speed forward movement state through the following sequence. The clockwise swing of the parking operation arm 111 detaches the roller 112 of the extremity of the parking operation arm 111 from the parking inclined surface 116p of the parking lock lever 116, and the clockwise swing of the parking lock lever 116 unlocks the lock protrusion 116a. Accordingly, the parking state is released. In addition, the clockwise swing of the gear shift arm 102 turns the shift drum 90 in the counterclockwise direction via the shift drum input gear 95. Thus, with the shift forks 82, 83 guided by the respective guide grooves 91f, 91r of the shift drum 90, the high/low speed changing shifter member 63 moves frontward in the axial direction, and comes into mesh with the clutch receiving member 64L. Thereby, the high/low speed changing shifter member 63 transmits the turn of the transmission driving shaft 61 to the low-speed driving gear 65. Further, the high/low speed changing shifter member 63 transmits the turn of the transmission driving shaft 61 to the low-speed driven gear 75 in mesh with the low-speed driving gear 65 and the transmission driven shaft (output shaft) 71.

It should be noted that while in the low-speed frontward movement state, the frontward/rearward movement switching shifter member 66 is not in mesh with the clutch receiving member 67R.

Once the further turn of the shift spindle 101 in the clockwise direction swings the gear shift arm 102 in the clockwise direction and the state shown in FIG. 6 is set up, the auxiliary transmission Ts establishes the high-speed forward movement state through the following sequence. With the shift fork 82 guided by the guide groove 91r, the high/low speed changing shifter member 63 moves rearward in the axial direction due to the turn of the shift drum 90, and comes into mesh with the clutch receiving member 64H, as well as transmits the rotation of the transmission driving shaft 61 to the high-speed driving gear 62. Further, the high/low speed changing shifter member 63 transmits the rotation of the transmission driving shaft 61 to the high-speed driven gear 72 in mesh with the high-speed driving gear 62 and the transmission driven shaft (output shaft) 71.

It should be noted that while in the high-speed forward movement state, the frontward/rearward movement switching shifter member 66 is not in mesh with the clutch receiving member 67R, either.

The foregoing transmission operation is manually carried out in the auxiliary transmission Ts.

It should be noted that: while in the high-speed frontward movement state, the vehicle is driven in the two-wheel driving mode; and while in the low-speed frontward movement state and in the rearward movement state, the vehicle is driven in the four-wheel driving mode.

When the auxiliary transmission Ts is assembled, the engagement pin portions of the multiple shift forks need to be brought into engagement with the respective required guide grooves. For this reason, the assembling work of the shift drum in the transmission driving mechanism has been difficult work which requires the skill. In contrast, the transmission driving mechanism 80 makes the work easier by using the work groove 91s since the work groove 91s oriented in the axial direction orthogonal to the two guide grooves 91f, 91r formed in the outer peripheral surface of the drum main body 91 of the drum shaft 90 in the circumferential direction are formed from the one end surface to the opposite end surface.

When the auxiliary transmission Ts to be projectingly provided almost overlapping the front portion of the main transmission Tm is assembled, the damper shaft 51 on which the cam-type torque damper 52 and the intermediate cylindrical gear member 57 are mounted; the transmission driving shaft 61 on which the driving gears 62, 63, 68, the shifter members 63, 66, the driving shaft input gear and the parking gear 69 are mounted; as well as the transmission driven shaft (output shaft) 71 on which the driven gears 72, 75 are mounted are pivotally supported by the rear auxiliary transmission case 42 closer to the main transmission Tm, with the gears brought into mesh with one another.

Figure 11:
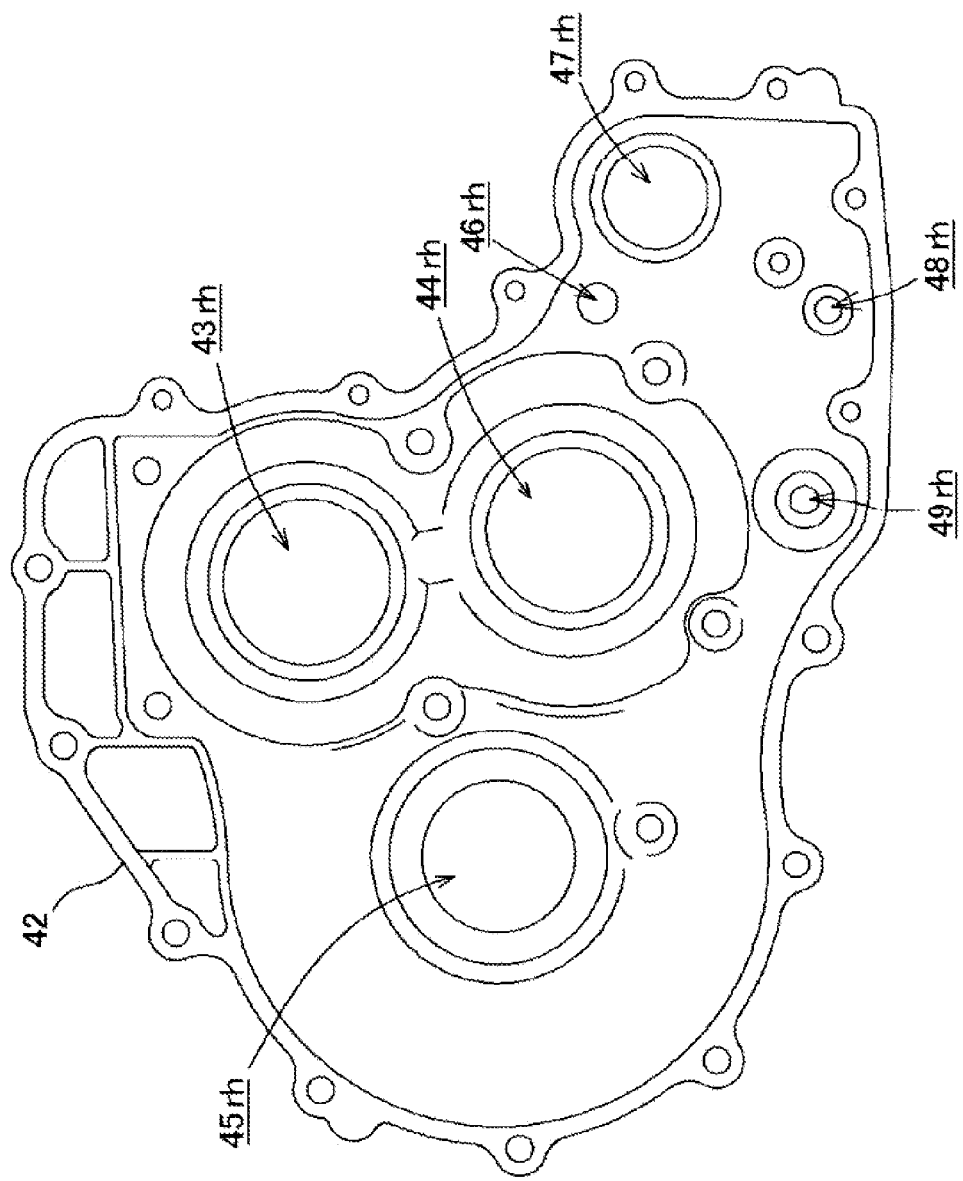
FIG. 11 is an inner surface view of a rear auxiliary transmission case.

FIG. 11 is an inside view (front view) of the rear auxiliary transmission case 42. The bearing hole 43rh configured to pivotally support the damper shaft 51 is formed above the center of the rear auxiliary transmission case 42 in the left-right direction. The bearing hole 44rh configured to pivotally support the transmission shaft 61 is formed below the bearing hole 43rh. The bearing hole 45rh configured to pivotally support the transmission driven shaft (output shaft) 71 is formed on the right (the left in FIG. 11) of the upper and lower bearing holes 43rh, 44rh.

In addition, in the rear auxiliary transmission case 42, the bearing recess portion 47rh configured to pivotally support the shift drum 90 is formed on the left side of the bearing hole 44rh; the shaft hole 46rh configured to pivotally support the shift fork shaft 81 is formed between the bearing hole 44rh and the bearing recess portion 47rh; the shaft hole 48rh configured to pivotally support the shift spindle 101 is formed below the shaft hole 46rh; and a shaft hole 49rh configured to pivotally support the lever spindle 115 is formed below the bearing hole 44rh.

The rear end of the damper shaft 51 is pivotally supported by the bearing hole 43rh with the bearing 43r interposed in between. The rear end of the transmission driving shaft 61 is pivotally supported by the bearing hole 44rh with the bearing 44r interposed in between. The rear end of the transmission driven shaft (output shaft) 71 is pivotally supported by the bearing hole 45rh with the bearing 45r interposed in between.

In addition, the shift fork shaft 81, which the front and rear shift forks 83, 82 with the coil spring 84 interposed in between are supported by and mounted on, is fitted into and pivotally supported by the shaft hole 46rh.

When doing so, the shift fork 82 is fitted into the shift fork groove 63v of the high/low speed changing shifter member 63, and the shift fork 83 is fitted into the shift fork groove 66v of the frontward/rearward movement switching shifter member 66.

Figure 12:
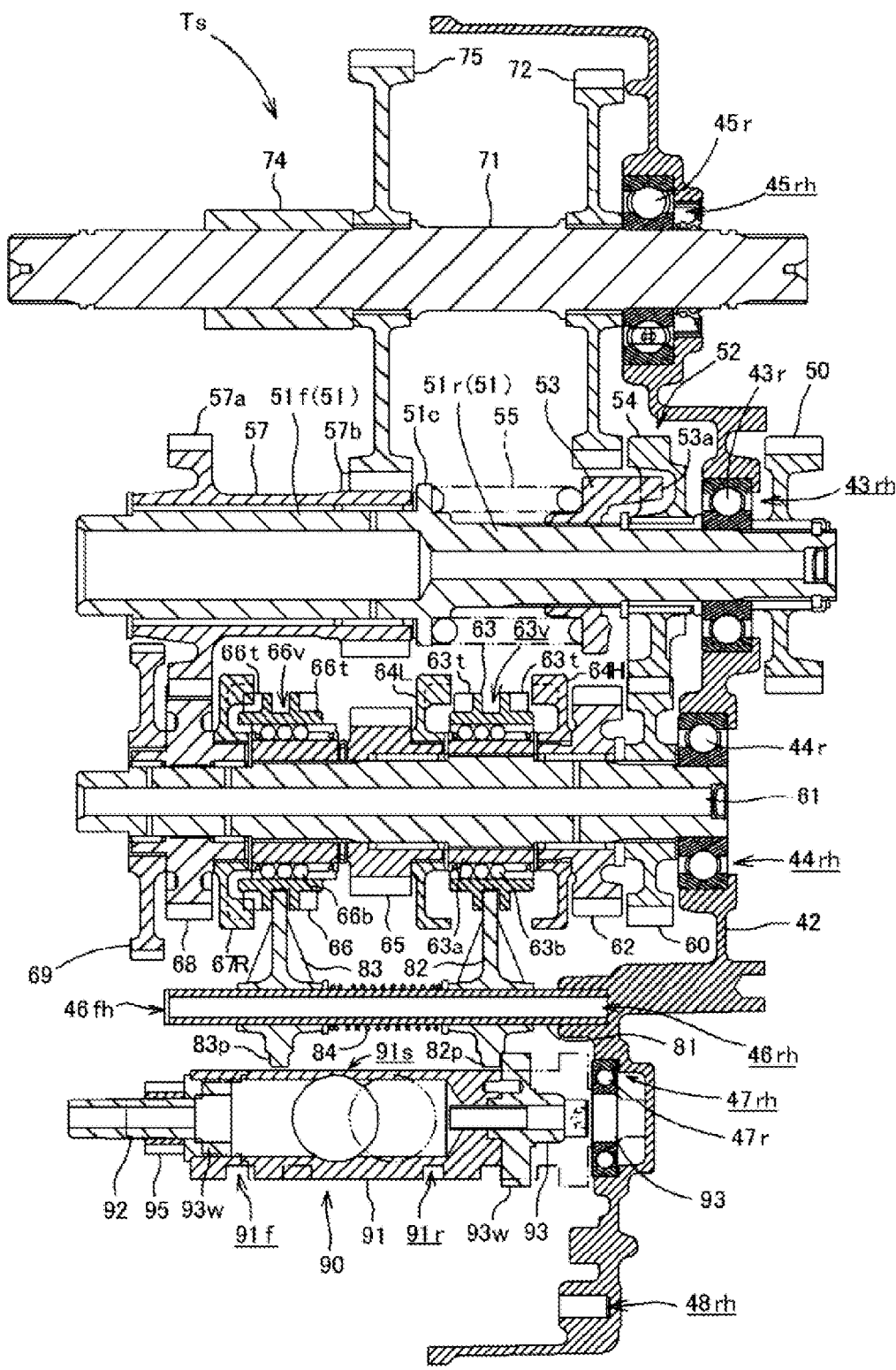
FIG. 12 is a cross-sectional view of the auxiliary transmission, which shows a state immediately before the shift drum is pivotally supported by the rear auxiliary transmission case.

FIG. 12 shows the state in which as described above, the damper shaft 51, the transmission driving shaft 61, the transmission driven shaft (output shaft) 71 and the shift fork shaft 81 are pivotally supported by and installed in the rear auxiliary transmission case 42.

The front and rear shift forks 83, 82 are biased by the coil spring 84, and are thus away from each other to a large extent. For this reason, the pivotal support of the shift drum 90 by the predetermined bearing recess portion 47rh of the rear auxiliary transmission case 42 while the engagement pin portions 82p, 83p of the shift forks 82, 83 thus biased are brought into engagement with the guide grooves 91f, 91r of the shift drum 90 is not easy work in the conventional practice. The shift drum 90, however, can be easily installed in the rear auxiliary transmission case 42, as described below, by use of the work groove 91s orthogonal to the guide grooves 91f, 91r.

Once the shift fork shaft 81 is pivotally supported by the rear auxiliary transmission case 42 with the shift forks 82, 83 fitted in the respective shifter members 63, 65, the engagement pin portions 82p, 83p of the respective shift forks 82, 83 are arranged in a line in the axial direction. For this reason, as indicated with a continuous line in FIG. 12, while the engagement pin portions 82p, 83p arranged in a line are put in engagement with the work groove 91s oriented in the axial direction, the shift drum 90 can be positioned with the drum spindle 93 placed in parallel to the shift fork shaft 81 and faced to the hole of the inner race of the bearing 47r press-fitted in the bearing recess portion 47rh of the rear auxiliary transmission case 42.

The shift drum 90 is moved from this position rearward in the axial direction, and the drum spindle 93 is press-fitted into the inner race of the bearing 47r which has been press-fitted in the bearing recess portion 47rh. Thereby, the shift drum 90 can be pivotally supported at the predetermined location (see chain double-dashed lines in FIG. 2).

Subsequently, with the shift forks 82, 83 brought closer to each other against the biasing force of the coil spring 84, the engagement pin portions 82p, 83p of the shift forks 82, 83 are positioned in the axial direction in a way that the engagement pin portions 82p, 83p face the guide grooves 91r, 91f, and the shift drum 90 is turned. Thereby, as shown in FIG. 10, the engagement pin portions 82p, 83p of the shift forks 82, 83 can be brought into engagement with the guide grooves 91r, 91f, respectively. Accordingly, the shift drum 90 can be pivotally supported by the bearing recess portion 47rh of the rear auxiliary transmission case 42 with the bearing 47r interposed in between.

The above-described assembling work of pivotally supporting the shift drum 90 by the rear auxiliary transmission case 42 can be easily carried out by those who are not skilled workers.

Thereafter, the shift spindle 101 is installed in the rear auxiliary transmission case 42. Subsequently, from the front, the front auxiliary transmission case 41 in which the bearings 43f, 44f, 45f have been press-fitted in the bearing recess portions 43fh, 44fh and the bearing hole 45fh is assembled with the rear auxiliary transmission case 42. Thereby, the front ends of the damper shaft 51, the transmission driving shaft 61, the transmission driven shaft (output shaft) 71, the shift fork shaft 81, the drum spindle 92 and the shift spindle 101 are pivotally supported. Accordingly, the auxiliary transmission Ts can be easily assembled.

It should be noted that since the drum end wall 92w of the drum spindle 92 on the front side is open without closing the front end opening of the work groove 91s, the engagement pin portion 83p of the shift fork 83 on the front side can be faced to the work groove 91s, even if the engagement pin portion 83p is out of engagement with and off the work groove 91s to the front when the shift drum 90 is positioned to the location indicated with the continuous line in FIG. 12. For this reason, the engagement pin portion 83p can be brought into engagement with the work groove 91s even after the shift drum 90 is pivotally supported by the rear auxiliary transmission case 42. Thereafter, the engagement pin portion 83p can be easily brought into engagement with the guide groove 91f.

In the shift drum 90 of the embodiment, the drum spindles 92, 93 and the drum end walls 92w, 93w are bodies separated from the drum main body 91. Instead, however, these components may be formed integrally with the drum main body 91.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A shift drum structure for a drum-type transmission, comprising:

a shift drum including a cylindrical drum main body and drum spindles projecting outward from drum end walls on a respective two sides of the drum main body, and a guide groove formed in an outer peripheral surface of the drum main body in a circumferential direction, a work groove formed in the shift drum in the outer peripheral surface of the drum main body from one end surface to an opposite end surface of the drum main body, or to the guide groove near the opposite end surface, the work groove oriented in the axial direction orthogonal to the guide groove, wherein the two sides of the drum body include a front end side and a rear end side, a flower-shaped cam portion is arranged in the front end side of the drum body, a shift drum input gear is arranged in the rear end side of the drum body, the shift drum input gear is open without closing the front end side opening of the work groove, and a shift fork moving on a shift fork shaft in an axial direction while guided by the guide groove in response to a turn of the shift drum is configured to change speeds by sliding a shifter member on a transmission driving shaft pivotally supporting a transmission gear.

2. The shift drum structure for a drum-type transmission according to claim 1, wherein at least one of the drum end walls does not close an opening in one corresponding end surface of the work groove.

3. The shift drum structure for a drum-type transmission according to claim 1, wherein the drum-type transmission is covered with a pair of transmission cases splittable in the axial direction, and in a state where an end portion of the transmission driving shaft on which the transmission gear and the shifter member are mounted is positioned to and supported by a predetermined bearing portion of the one transmission case with a bearing interposed in between, and concurrently in a state where an end portion of the shift fork shaft on which the shift fork is mounted is fitted into, positioned to, and supported by a predetermined shaft hole of the one transmission case in advance, the shift drum is installed by: moving the shift drum in the axial direction while oriented in parallel to the shift fork shaft with an engagement pin portion of the shift fork put in engagement with the work groove of the drum main body; and pivotally supporting the one drum spindle by a predetermined bearing portion of the one transmission case with a bearing interposed in between.

4. The shift drum structure for a drum-type transmission according to claim 2, wherein the drum-type transmission is covered with a pair of transmission cases splittable in the axial direction, and in a state where an end portion of the transmission driving shaft on which the transmission gear and the shifter member are mounted is positioned to and supported by a predetermined bearing portion of the one transmission case with a bearing interposed in between, and concurrently in a state where an end portion of the shift fork shaft on which the shift fork is mounted is fitted into, positioned to, and supported by a predetermined shaft hole of the one transmission case in advance, the shift drum is installed by: moving the shift drum in the axial direction while oriented in parallel to the shift fork shaft with an engagement pin portion of the shift fork put in engagement with the work groove of the drum main body; and pivotally supporting the one drum spindle by a predetermined bearing portion of the one transmission case with a bearing interposed in between.

5. The shift drum structure for a drum-type transmission according to claim 3, wherein the drum-type transmission is an auxiliary transmission in a power unit which includes a main transmission and the auxiliary transmission, and of the pair of transmission cases, the one transmission case which the transmission driving shaft, the shift fork shaft and the one drum spindle of the shift drum are positioned to and supported by in advance is made on the main transmission side.

6. The shift drum structure for a drum-type transmission according to claim 4, wherein the drum-type transmission is an auxiliary transmission in a power unit which includes a main transmission and the auxiliary transmission, and of the pair of transmission cases, the one transmission case which the transmission driving shaft, the shift fork shaft and the one drum spindle of the shift drum are positioned to and supported by in advance is made on the main transmission side.

7. The shift drum structure for a drum-type transmission according to claim 3, wherein a plurality of the shift forks are pivotally supported by the shift fork shaft in a way that the shift forks are movable in the axial direction, and the shift forks are biased by a spring in the axial direction.

8. The shift drum structure for a drum-type transmission according to claim 4, wherein a plurality of the shift forks are pivotally supported by the shift fork shaft in a way that the shift forks are movable in the axial direction, and the shift forks are biased by a spring in the axial direction.

* * * * *